(12) United States Patent
Petzold

(10) Patent No.: US 8,831,804 B2
(45) Date of Patent: *Sep. 9, 2014

(54) METHOD FOR CONTROLLING AN AUTOMATIC GEARED TRANSMISSION

(75) Inventor: Rainer Petzold, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 102 days.

This patent is subject to a terminal disclaimer.

(21) Appl. No.: 13/128,056

(22) PCT Filed: Nov. 5, 2009

(86) PCT No.: PCT/EP2009/064687
§ 371 (c)(1),
(2), (4) Date: May 6, 2011

(87) PCT Pub. No.: WO2010/052273
PCT Pub. Date: May 14, 2010

(65) Prior Publication Data
US 2011/0218699 A1     Sep. 8, 2011

(30) Foreign Application Priority Data
Nov. 7, 2008  (DE) .......................... 10 2008 043 560

(51) Int. Cl.
| | |
|---|---|
| *B60K 6/36* | (2007.10) |
| *F16H 59/00* | (2006.01) |
| *B60W 30/18* | (2012.01) |
| *B60W 10/10* | (2012.01) |
| *B60W 10/02* | (2006.01) |
| *B60W 10/11* | (2012.01) |
| *F16H 61/16* | (2006.01) |
| *F16H 59/54* | (2006.01) |
| *F16H 61/21* | (2006.01) |
| *F16H 59/44* | (2006.01) |
| *F16H 59/22* | (2006.01) |
| *F16H 61/20* | (2006.01) |
| *F16H 59/56* | (2006.01) |

(52) U.S. Cl.
CPC ..... *B60W 30/18054* (2013.01); *B60W 2540/12* (2013.01); *F16H 59/54* (2013.01); *B60L 2240/486* (2013.01); *F16H 2061/213* (2013.01); *F16H 2059/443* (2013.01); *B60W 10/02* (2013.01); *F16H 61/21* (2013.01); *B60W 2540/16* (2013.01); *F16H 59/22* (2013.01); *F16H 2061/205* (2013.01); *B60W 10/11* (2013.01); *B60W 30/18118* (2013.01); *F16H 61/16* (2013.01); *F16H 59/56* (2013.01); *Y10S 903/902* (2013.01)
USPC .......................... 701/22; 180/65.27; 903/902

(58) Field of Classification Search
None
See application file for complete search history.

(56) References Cited

U.S. PATENT DOCUMENTS

| | | | | |
|---|---|---|---|---|
| 4,131,171 A * | 12/1978 | Keyes | ............ | 180/54.1 |
| 5,012,418 A * | 4/1991 | Petzold | ........... | 701/95 |
| 5,376,869 A * | 12/1994 | Konrad | ........... | 318/587 |
| 6,093,974 A * | 7/2000 | Tabata et al. | ............. | 290/40 R |
| 6,213,911 B1 * | 4/2001 | Salecker et al. | .............. | 477/97 |
| 6,324,459 B1 * | 11/2001 | Jung | ................. | 701/70 |
| 6,332,524 B1 * | 12/2001 | Shin | ............. | 192/220.2 |
| 6,920,383 B2 | 7/2005 | Graf et al. | | |
| 7,223,204 B2 | 5/2007 | Steen et al. | | |
| 7,375,438 B2 * | 5/2008 | Schmidt | ........... | 307/9.1 |
| 7,828,694 B2 * | 11/2010 | Silveri et al. | ........... | 477/3 |
| 7,833,127 B2 * | 11/2010 | Petzold et al. | ............ | 477/97 |
| 8,090,499 B2 * | 1/2012 | Tamai | ............. | 701/38 |
| 8,255,138 B2 * | 8/2012 | Bach et al. | ........ | 701/78 |
| 8,317,654 B2 | 11/2012 | Petzold | | |
| 2001/0008989 A1 * | 7/2001 | Minowa et al. | ............. | 701/96 |
| 2003/0085576 A1 * | 5/2003 | Kuang et al. | ............. | 290/40 C |
| 2005/0075775 A1 * | 4/2005 | Carlson et al. | ............. | 701/51 |
| 2006/0129299 A1 * | 6/2006 | Schmidt | ............ | 701/71 |
| 2006/0247092 A1 * | 11/2006 | Shin | ................ | 477/99 |
| 2007/0278021 A1 * | 12/2007 | Pott et al. | .............. | 180/65.2 |
| 2008/0039280 A1 * | 2/2008 | Petzold et al. | ............. | 477/70 |
| 2010/0190605 A1 * | 7/2010 | Petzold | ............ | 477/111 |
| 2011/0218699 A1 * | 9/2011 | Petzold | ............ | 701/22 |

FOREIGN PATENT DOCUMENTS

| | | |
|---|---|---|
| DE | 4426260 A1 | 2/1995 |
| DE | 197 33 465 A1 | 2/1998 |
| DE | 197 43 674 A1 | 4/1998 |
| DE | 199 26 697 A1 | 12/2000 |
| DE | 19928374 C1 | 12/2000 |
| DE | 199 42 715 A1 | 3/2001 |
| DE | 101 24 989 A1 | 12/2002 |
| DE | 102 58 834 A1 | 7/2004 |
| DE | 102007036337 A1 | 2/2009 |
| EP | 0 992 386 A1 | 4/2000 |
| JP | 2010-106561 * | 5/2010 |
| WO | 03/002368 A1 | 1/2003 |
| WO | WO 2004039647 A1 * | 5/2004 ................ B60T 7/12 |
| WO | 2005/084995 A1 | 9/2005 |
| WO | 2009/015992 A1 | 2/2009 |

OTHER PUBLICATIONS

Derwent No. 2010-F30575 to Go, H dated Oct. 28, 2008 citing JP 2010-106464.*

Derwent No. 2008-C70324 to Shin et al. dated Aug. 8, 2006 citing JP 2008-38503.*

German Search Report issued in corresponding German Application No. 10 2008 043 560.0 mailed on Feb. 13, 2014.

* cited by examiner

*Primary Examiner* — John R Olszewski
*Assistant Examiner* — Jean-Paul Cass
(74) *Attorney, Agent, or Firm* — Davis & Bujold, PLLC; Michael J. Bujold

(57) ABSTRACT

A method of controlling an automatic geared transmission of a vehicle drive train. The transmission is linked, on the input side, to a hybrid drive which comprising an engine and an electric motor and, on the output side, to an axle drive and wheels. During vehicle stand still with the engine and/or electric motor operating and a disengaged drive train, rolling of the motor vehicle is prevented, or at least limited, by shifting the transmission. When the automatic geared transmission is in the neutral position ($G_I=N$), a safety function is activated to avoid uncontrolled rolling of the vehicle in which actuation of shift operating elements, the throttle and the brake pedal, as well as the rolling speed, are captured by sensors and in which, when the drive operating elements (shift operating element $x_{SBE}=0$, throttle $x_{FP}=0$, brake pedal $x_{BP}=0$) are not activated, a starting gear is engaged once a predetermined limiting speed ($v_{Roll}>v_{Gr}$) is exceeded.

20 Claims, 6 Drawing Sheets

METHOD FOR CONTROLLING AN AUTOMATIC GEARED TRANSMISSION

This application is a National Stage completion of PCT/EP2009/064687 filed Nov. 5, 2009, which claims priority from German patent application serial no. 10 2008 043 560.0 filed Nov. 7, 2008.

FIELD OF THE INVENTION

The invention relates to a method for controlling an automatic geared transmission which, as part of the drive train of a motor vehicle, is linked, on the input side, to a hybrid drive comprising of a combustion engine and an electric motor, and linked, on the output side, with the driven wheels of a drive axle, via an axle drive, whereby when the vehicle is at standstill, the combustion engine and/or electric motor is running, and the drive train is disengaged, the motor vehicle is prevented from rolling, or at least the rolling is limited, by means of shifting the geared transmission.

BACKGROUND OF THE INVENTION

An automatic geared transmission, as in the previously described art, is meant to be an automated shift transmission, an automatic clutch transmission, and a planetary automatic transmission. The term automatic geared transmission shall also include an automatic transmission where the transmission ratio can be continuously changed, but where a switch-over gear enables the transmission output drive shaft to reverse direction of rotation and in which, by means of suitably controlling transmission ratio change tools, it is possible to shift fixed pre-programmed transmission ratio steps.

An automatic geared transmission, designed as a lay shaft transmission, is usually linked to the engine with its input shaft via a single, controllable friction clutch, meaning an automatic engaging and disengaging such as, for instance, a passively engaging single disc or multiple disk dry clutch or an actively engaging multiple disk clutch, whereby the friction clutch performs the function of a starting element as well as the one of a shift clutch. In an automated double clutch transmission, constructed with two partial transmissions, with each having an input shaft, the two input shafts are each connectable with the engine via a controllable friction clutch. In contrast, a planetary automatic transmission is usually linked to the engine, by its input shaft, via a starting element which is designed as a hydro dynamic torque converter. But other combinations of automatic geared transmissions and starting elements are also possible, for instance a combination of an automatic geared transmission and an upstream hydro dynamic torque converter or a combination of a planetary automatic transmission with an upstream friction clutch.

In a motor vehicle where the drive train comprises such a combination of a geared transmission and a starting element, there is a general risk that when the engine is running with a disengaged drive train, meaning when the gearing is in a neutral position and/or the starting element is disengaged, that the motor vehicle starts rolling, unintended by the driver and similar to an engaged gear or along a down slope, which can create a dangerous situation for the passengers as well as for other users of the road.

It is therefore possible, for instance, that a motor vehicle which is equipped with an automatic geared transmission and a passively engaging friction clutch might start on its own with a running engine, a disengaged friction clutch and an engaged gear if there is a defect in the clutch control due to failure and the engaging friction clutch. To avoid this situation, a device and a method is proposed, in DE 199 26 697 A1, in which, when the motor vehicle has stopped and when the engine is running, the friction clutch is disengaged, and a gear is engaged, the geared transmission switches to its neutral position, meaning that the engaged gear becomes disengaged, when a not-ready to drive condition of the motor vehicle is recognized during a predetermined time interval.

A similar method, as in DE 102 58 834 A1, has in principle several other constructive drive trains so that for a standing motor vehicle, with a running engine, a disengaged friction clutch and an engaged gear, the geared transmission is shifted to neutral if over a predetermined time interval and open door of the motor vehicle is detected. Hereby, any unwanted starting of the motor vehicle, due to a failure in the clutch control or because of an unintended activation of a drive operating element, especially the throttle which will cause engagement of the friction clutch, can be avoided.

However, any unwanted rolling of the motor vehicle, due to a present uphill road slope or a downhill slope, respectively, hereby can not be prevented. In the case of a disengaged drive train and for a secure fixing of the motor vehicle, requires the driver to engage or sufficiently activate a parking brake. If the parking brake is not engaged or not sufficiently activated, for instance when the driver has underestimated the present slope and has, therefore, not sufficiently activated the parking brake, or when another passenger has unintentionally disengaged the parking brake, the motor vehicle can roll uncontrolled downhill. If the driver is in the driver seat in that situation and recognizes rolling, the uncontrolled rolling can be prevented by activating the brake or by engaging a gear, via the shift operating elements, and, if necessary, by activating the throttle. This, however, requires the driver to be present in his seat and the driver to have a high level of responsiveness, which cannot always be guaranteed.

SUMMARY OF THE INVENTION

With that background in mind, it is the task of the invention to present a method for controlling an automatic geared transmission, as previously described in the art, through which uncontrolled motor vehicle rolling, under the previously described conditions, can be avoided or at least limited in a simple way for the previously described conditions, and thereby increasing traffic safety.

The task is solved in the case where, on the input side, via a hybrid drive which comprises a combustion engine and an electric motor with at least a controllable friction clutch, which are linked to the automatic geared transmission in such a way so that, when the geared transmission is in a neutral position, a safety function is activated and that sensors capture activation of a shift operating element, of the throttle, and of the brake pedal, as well as an actual rolling speed and in which, when drive operating elements are not activated (shift operating element, throttle, brake pedal), if a previously determined limiting speed is exceeded, it causes the friction clutch to disengage and, if necessary, to engage a start gear and to engage the friction clutch.

In the case where an automatic geared transmission is, on the input side, immediately linked with a hybrid drive comprising a combustion engine and an electric motor, for a geared transmission which is in the neutral position, a safety function is activated in which sensors capture activation of a shift operating element, of the throttle, and the brake pedal, as well as the actual rolling speed and in which, when drive operating elements are not activated (shift operating element, throttle, brake pedal), exceeding a predetermined speed limit causes the engagement of a starting gear.

Advantageous and practical embodiments, as well as advances of the invented methods, are the subject of the dependent claims whereby the references in regard to construction of the drive starting element and the different dependent claims have to be considered.

Thus, the invention is based on a motor vehicle with an automatic geared transmission which comprises, on the input side within the drive train of a motor vehicle, at least a controllable friction clutch or which has immediately a hybrid drive which comprises of a combustion engine and an electric motor and which, on the output side, is connected with driven wheels of a drive axle, via an axle drive. In accordance with the invention, at a vehicle standstill and when a combustion engine and/or an electric motor is running, and at least the geared transmission is in its neutral position and the drive train is disengaged, the rolling of the motor vehicle is automatically prevented, or at least limited, without any activity of the driver, when necessary, by disengaging a starting element, engaging a starting drive gear, and, when needed, engaging the starting element whereby a significant increase with regard to traffic safety of the motor vehicle is achieved. Hereby, disengaging and engaging the starting drive element can be omitted if it is designed as an electric motor as part of the hybrid drive.

Through shifting to the start gear and the required engagement of the starting element, the drive train is engaged and the thus, through a brake effect of the combustion engine and/or the electric motor, the motor vehicle is prevented from uncontrolled rolling. The invented method can be implemented into modern motor vehicles, already equipped with the respective sensors, in a simple manner and does not require any additional equipment. Thus, beside sensors for recording actuation of shifting operating elements, such as a shift lever or gear selection lever, throttle, and the brake pedal, the method just requires the wheel speed sensors or a rotation speed sensor at the output shaft of the geared transmission, already present in modern motor vehicles, for recording the actual rolling speed.

The starting gear, which has to be engaged, can be selected and engaged independently of the rolling direction as a starting gear which matches the speed limit for a forward drive. Once the motor vehicle rolls forward, engagement of the forward gear brings the combustion engine and/or the electric motor into the deceleration mode, meaning that the rolling of the motor vehicle is held back due to the drag torque of the combustion engine and/or electric motor. Whether the motor vehicle, thereafter, is held back or accelerates is dependent on the drag torque in relationship to the downhill drive force. If the motor vehicle, on the other hand, rolls backwards, the torque of the combustion engine and the electric motor can cause a reversal of the rolling direction of the motor vehicle in the case of a sufficient downhill force. However, if not prevented through appropriate actions, a greater downhill force can cause the combustion engine of the hybrid drive to stall, whereby the motor vehicle is prevented from further rolling due to the stalled combustion engine.

As an alternative, it is also possible that the actual rolling direction is also captured, by the sensors, and that a starting gear is engaged which is effective in the rolling direction and which matches the speed limit. In this case, and on one hand, a general unfavorable stress is avoided when the combustion engine stalls and starting drive in the rolling direction is made easier, which can be initiated, for instance, through the driver activating a shift lever or a selector lever, respectively, and/or the throttle.

If the starting element is designed as a friction clutch, when the drive train is engaged and during the resulting following delay of the motor vehicle, meaning during the reduction of the rolling speed, it is useful to again disengage the friction clutch preferably below a previously predetermined minimum speed or at a previously determined rotation speed of the combustion engine and/or the electric motor. Hereby, the combustion engine is prevented from stalling so that the operational readiness of the hybrid drive and its dependent, partially additional safety functions are maintained. If the driver does not timely intervene, rolling and braking can be repeated several times through engagement of the starting gear, which results in some kind of saw tooth profile of the rolling speed, which captures the attention of a previously non-active passenger and which results in his intervention.

Under the condition of a disengaged friction clutch, the starting gear can remain temporarily engaged. After the friction clutch is disengaged, it is, however, advantageous to establish a functional disengaged drive train operational readiness and especially with a passively engaging friction clutch and, to avoid a malfunctioning rolling, to disengage the starting gear at the latest when a motor vehicle stand still has been reached.

However, if the starting element is designed as an electric motor of a hybrid drive, it is useful just to determine the engaged starting gear, in the case of an engagement of the drive train and the following delay of the motor vehicle, and its lower deviation of the previously determined minimum speed or of the previously determined minimum rotation speed of the combustion engine and/or the electric motor.

During engagement of the drive train and following acceleration of a motor vehicle, meaning during an additional increase of the rolling speed, when reaching or exceeding a previously determined maximum speed or of a previously determined maximum rotation speed of the combustion engine and/or the electric motor, it can be shifted up to next gear to avoid an overspeeding of the combustion engine and/or the electric motor. Hereby, however, the braking force of the combustion engine and/or electric motor, which is effective at the wheels of the drive axle, is reduced but damage to or destruction of the combustion engine and/or the electric machine can be avoided.

Knowing the invention, it is self-explanatory that shifting to the next gear is performed in accordance with the construction of the gearing and the construction of the drive element, meaning that the friction clutch, as part of an automatic geared transmission, could be disengaged prior to changing the gear and will be engaged after the gear change. In an automatic double clutch transmission, at first the higher gear is engaged and the other partial transmission is then timely overlapped, the friction clutch of the assigned partial transmission and the engaged starting gear is disengaged, and the friction clutch which is assigned to the partial transmission and the higher gear is engaged, and finally the starting gear is disengaged.

To avoid a shift to the next higher gear, it can be provided that, due to engaging the drive train and following motor vehicle acceleration, when the combustion engine and/or an electric motor reaches or exceeds a previously determined maximum speed or a previously determined maximum rotation speed, the brake of the motor vehicle, like the operating brake or the parking brake, automatic activates. However, for the motor vehicle brake to automatically activate, additional active parts are required, such as brake pressure pump, a brake pressure control valve, or a brake activation motor.

The brake torque of the motor vehicle brake can be controlled in such a way that the motor vehicle rolling speed is kept constant, or that the motor vehicle rolling speed diminishes until motor vehicle stand still is reached.

If, during an activated safety function, at least one drive operating element is activated, such as a selector lever, a drive switch, a drive pedal, or a brake pedal, the safety function will be terminated and a switch-over to the regular starting or drive mode will take place.

If the starting element is designed as a friction clutch, it can be additionally provided that, prior to the safety function termination, at least actuating a shift operating elements and/or the brake pedal will cause the friction clutch to disengage. Since actuating a shift element, such as a drive switch or a selector lever and the brake pedal, anticipates shifting of gears to follow within the starting and drive mode, the gear change can be accelerated due to the earlier friction clutch disengagement. To the contrary, a continued driving in the currently engaged gear is principally possible by the actuation of the drive pedal, so that the friction clutch remains purposely engaged in this case.

BRIEF DESCRIPTION OF THE DRAWINGS

For the clarification of the invention, the specification has a drawings attached and they show.

DETAILED DESCRIPTION OF THE PREFERRED EMBODIMENTS

Figure 1A:
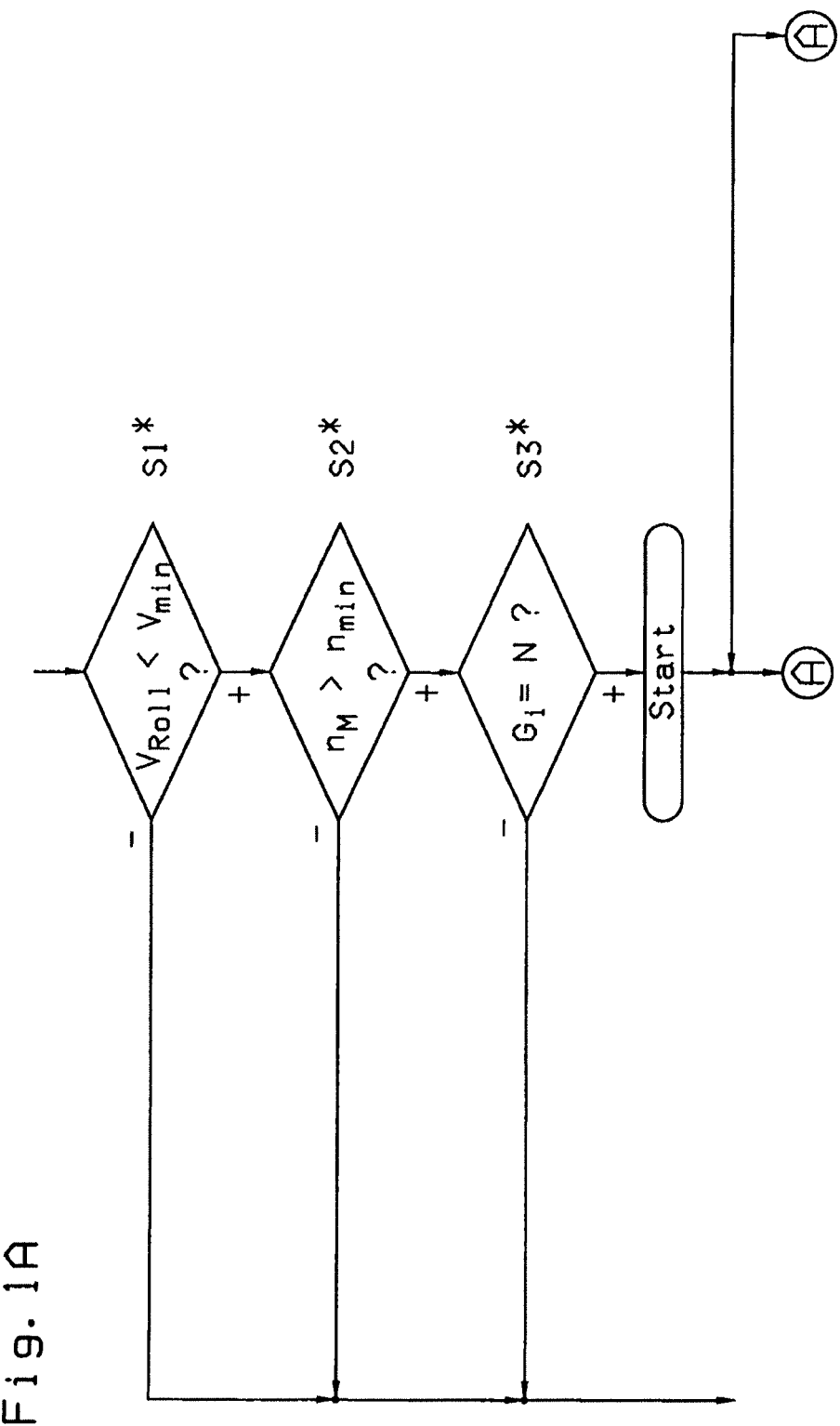
FIG. 1 a three-section flow chart, respectively comprising FIGS. 1A, 1B and 1C, of a preferred variation of the invented method for a drive train with an automatic shift transmission and a starting element which is designed as a friction clutch, and FIG. 2 a three-section flowchart, respectively comprising FIGS. 2A, 2B and 2C, of a preferred variation of the invented method for a drive train with a planetary automatic transmission and an electric motor of a hybrid drive designed as a starting element.

In accordance with the three-section flowchart in FIG. 1, which is valid for a drive train with a geared transmission, designed as an automatic geared transmission, and a starting element, designed as a passively engaging friction clutch, in accordance with FIG. 1A it is checked, in steps S1* to S3*, within a regular starting and drive mode if a vehicle stand still is present, as for instance by means of the wheel rotation speed sensors or a rotation speed sensor which is positioned at the geared transmission output shaft, whether the rolling speed $v_{Roll}$ is less than the determined minimum speed $v_{min}$, if the combustion engine and/or the electric motor is running, meaning that the captured combustion engine and/or electric motor $n_M$ engine rotation speed is greater than a determined minimum rotation speed $n_{min}$, which is provided by the engine control or through a rotation speed sensor which is positioned at the crankshaft, and if there is no gear engaged in the geared transmission, thus the actual engaged gear $G_I$ corresponds with the neutral gear, or the neutral position N, respectively, of the transmission.

If one of the three conditions is not met, the current starting mode or drive mode will be continued as unchanged. If, however, all three conditions are met, meaning that the vehicle is at a stand still and the combustion engine and/or electric motor is running, and the drive train is non-engaged due to the geared transmission being in the neutral position, a safety function is started, in accordance with the invention, to avoid or limit any unwanted rolling of the motor vehicle.

Figure 1B:
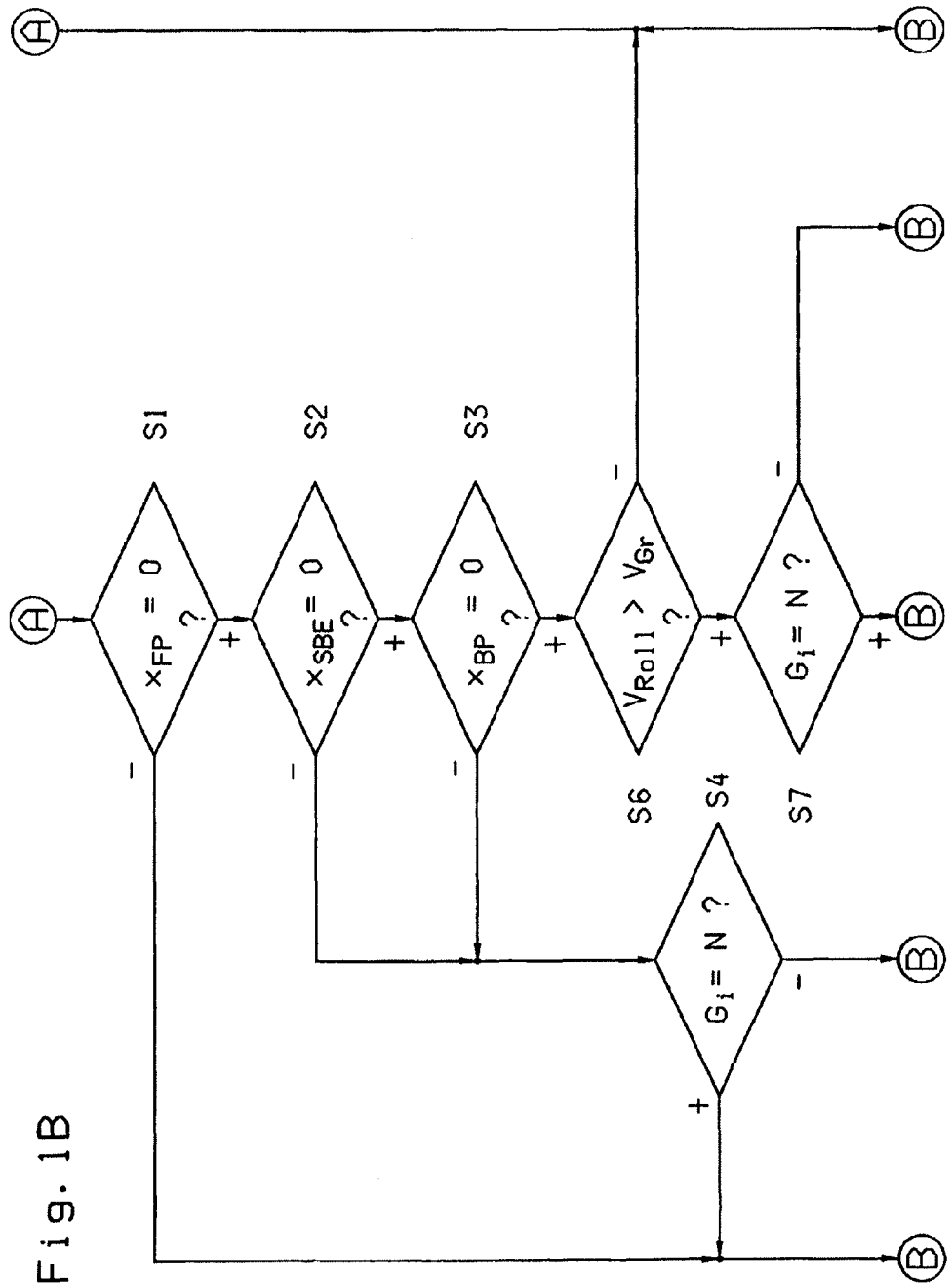

As a continuation of the flow chart as in FIG. 1A, in FIG. 1B it is checked, within the safety function in step S1, whether the throttle is activated, thus deflected from its idle position $x_{FP}=0$. If activation of the throttle is sensed, the safety function is immediately terminated and returned to the regular starting mode or drive mode.

Otherwise, the next step S2 checks if a shift activation element, such as a shift lever or a selector lever for instance, was activated, meaning that it was deflected from its neutral position $x_{SBE}=0$. If an activation of the shift activation element is sensed, meaning if a gear is engaged, which is checked in step S4, the friction clutch, as required, is disengaged in step S5 and, thereafter, the safety function is terminated and returned to the regular starting mode or drive mode (see FIG. 1C).

Otherwise, after the check in step S2, the following step S3 checks whether the brake pedal is activated, thus being deflected or has been deflected from its idle position $x_{BP}=0$. If activation of the brake pedal is sensed, the safety function, like previously and if required after disengagement of the friction clutch, is terminated and returned to the regular starting mode or drive mode.

Activation of a shift activating elements, such as the throttle or the brake pedal, is therefore interpreted as meaning that the driver is present in the driver seat and that the motor vehicle is under the control the driver so that rolling, which is unnoticed by the driver or an unwanted rolling of the motor vehicle, respectively, cannot occur or can be prevented by the driver through appropriate action.

If there has been no activation of the previously mentioned drive activation elements, the step S6 checks if the motor vehicle starts rolling on its own, meaning that a rolling speed condition $v_{Roll}$ is present which is greater and above a determined rolling speed limit $v_{Gr}$. If that is not the case, thus the rolling speed $v_{Roll}$ is almost equal to or close to zero, it branches back to before step S1 (see FIG. 1A). Otherwise, it is first checked, in step S7, whether the geared transmission is still in its neutral position ($G_I$=N) which was ascertained as the case during the first run through the function loop, however, it might not necessarily be the case, due to a possible engaged gear, during an additional run through the function loop.

Figure 1C:
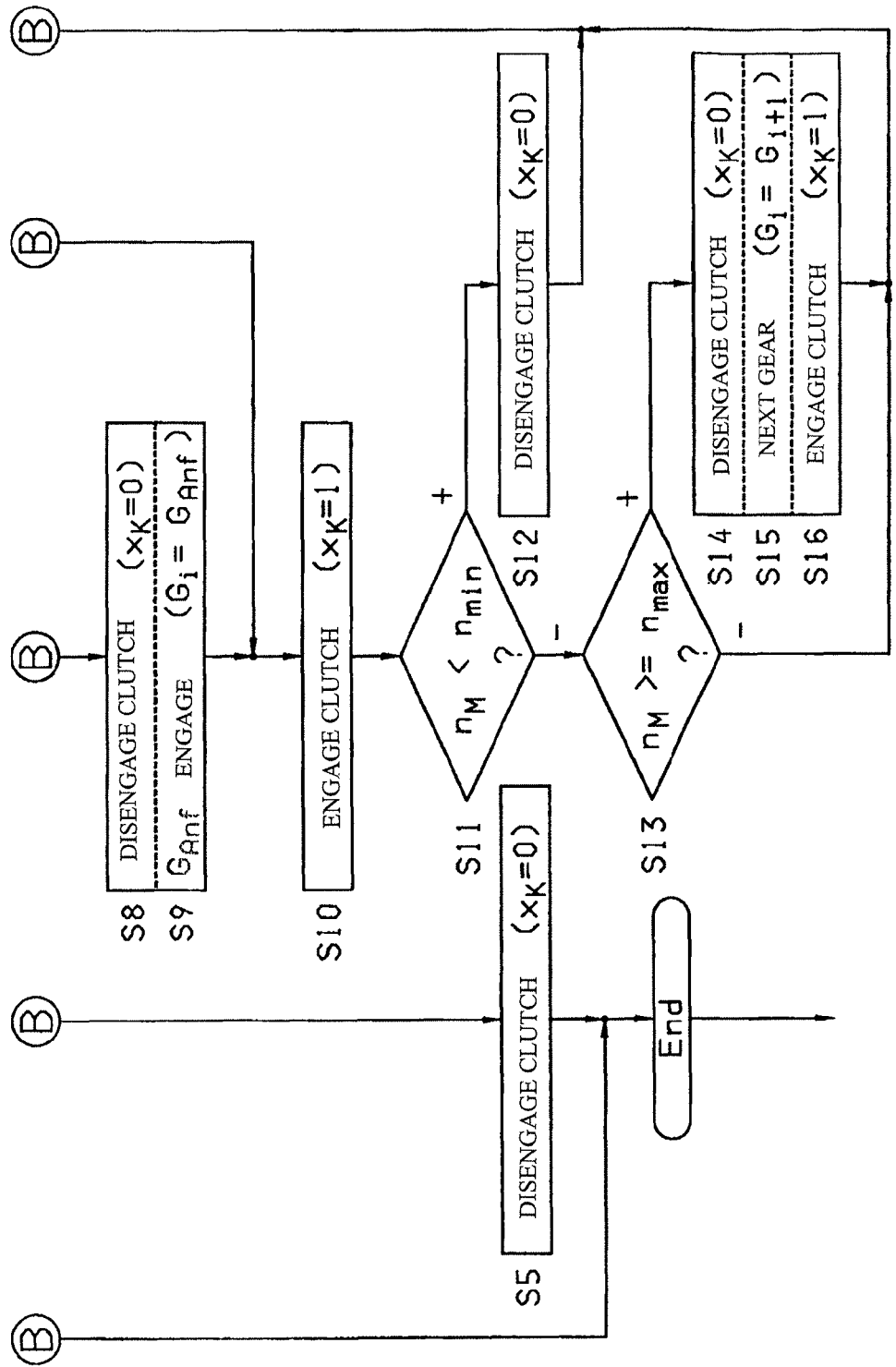

FIG. 1C, which is a continuation of the flow chart in accordance with FIG. 1B, shows that, in the neutral position of the geared transmission ($G_I$=N) and during the following steps S8 to S10, the friction clutch disengages ($x_K$=0), that a starting gear $G_{Anf}$ engages ($G_I$=$G_{Anf}$) which matches with the speed limit $v_{Gr}$ and, if necessary, also with the rolling direction, and that the friction clutch is again engaged ($x_K$=1), whereby under the condition of an engaged gear ($G_I \neq N$), in step 10, the disengaged friction clutch is engaged. When the starting gear is engaged, the engaging the friction clutch causes the rolling motor vehicle to brake due to the effect of the drag torque of the combustion engine and/or the electric motor and, therefore, noticeably reduces the danger of an uncontrolled rolling.

Thereafter, step S11 checks whether there is a possible danger of the combustion engine stalling. This situation occurs if an engaged starting gear is effective in the rolling direction and the drag torque of the combustion engine and/or electric motor, at the drive axle wheels, is greater than the down slope force so that the motor vehicle decelerates as desired. However, this situation can also occur if the engaged starting gear is effective contrary to the rolling speed and if the down slope force is greater than the traction force of the combustion engine and/or electric motor, which is effective at the drive axle wheels, so that the rolling can be decelerated somewhat, however, the rolling direction cannot be reversed. There is a danger, in both cases, that the combustion engine stalls, which is unfavorable with regard to stress technology.

To avoid this, the friction clutch is disengaged, in step S12, in this case and thereafter it branches back before step S1 (see FIG. 1A).

Otherwise, step S13 checks if there is a risk for overspeed of the combustion engine and/or the electric motor, whereby the combustion engine and/or electric motor rotation speed $n_M$ is greater or equal to a defined maximum rotation speed $n_{max}$. This situation occurs if the engaged starting gear is effective in the rolling direction and the drag torque of the combustion engine and/or the electric motor, transferred to the drive axle wheels, is less than the down slope force so that the motor vehicle, even under deceleration, still accelerates downhill. To avoid this case and overspeed, and thus subsequent damage or destruction of the combustion engine or of the electric motor, the friction clutch is disengaged, it is shifted to the next higher gear and the friction clutch is again engaged, in steps S14 to S16, before it branches back to step S1. Otherwise, it is immediately branched back to step S1 (see FIG. 1A).

As long as a shift activating elements, such as a shift lever or a selector lever, a throttle or a brake pedal, are respectively not actuated or sensed, steps S1 to S16 are repeatedly run whereby, depending on the rolling speed and the previous controller runs, conditions such as "engaged neutral position" ($G_I$=N) or "engaged gear" ($G_I \neq$N) of the geared transmission, and the conditions "disengaged" ($x_K$=0) or "engaged" ($x_K$=1) of the friction clutch can be present.

Figure 2A:
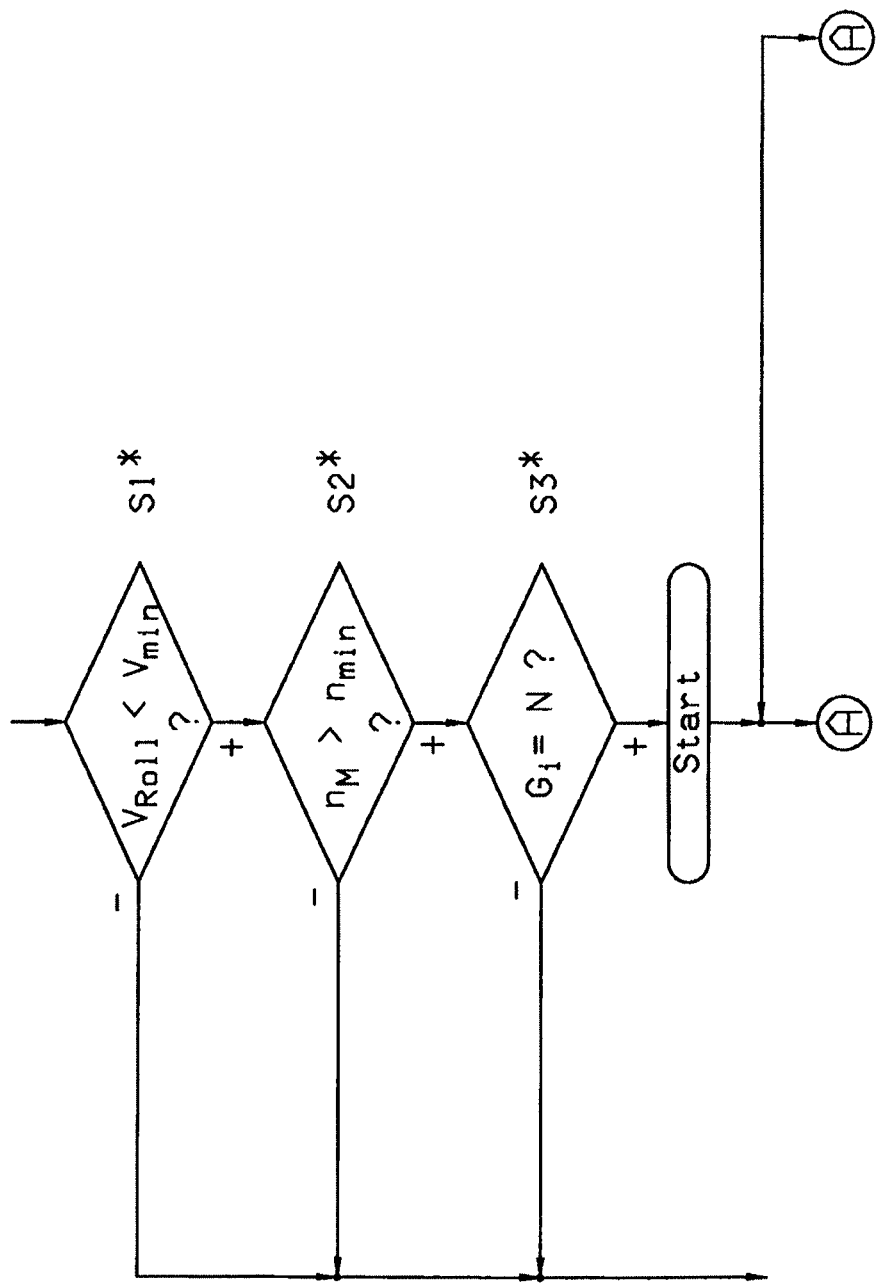
Figure 2B:
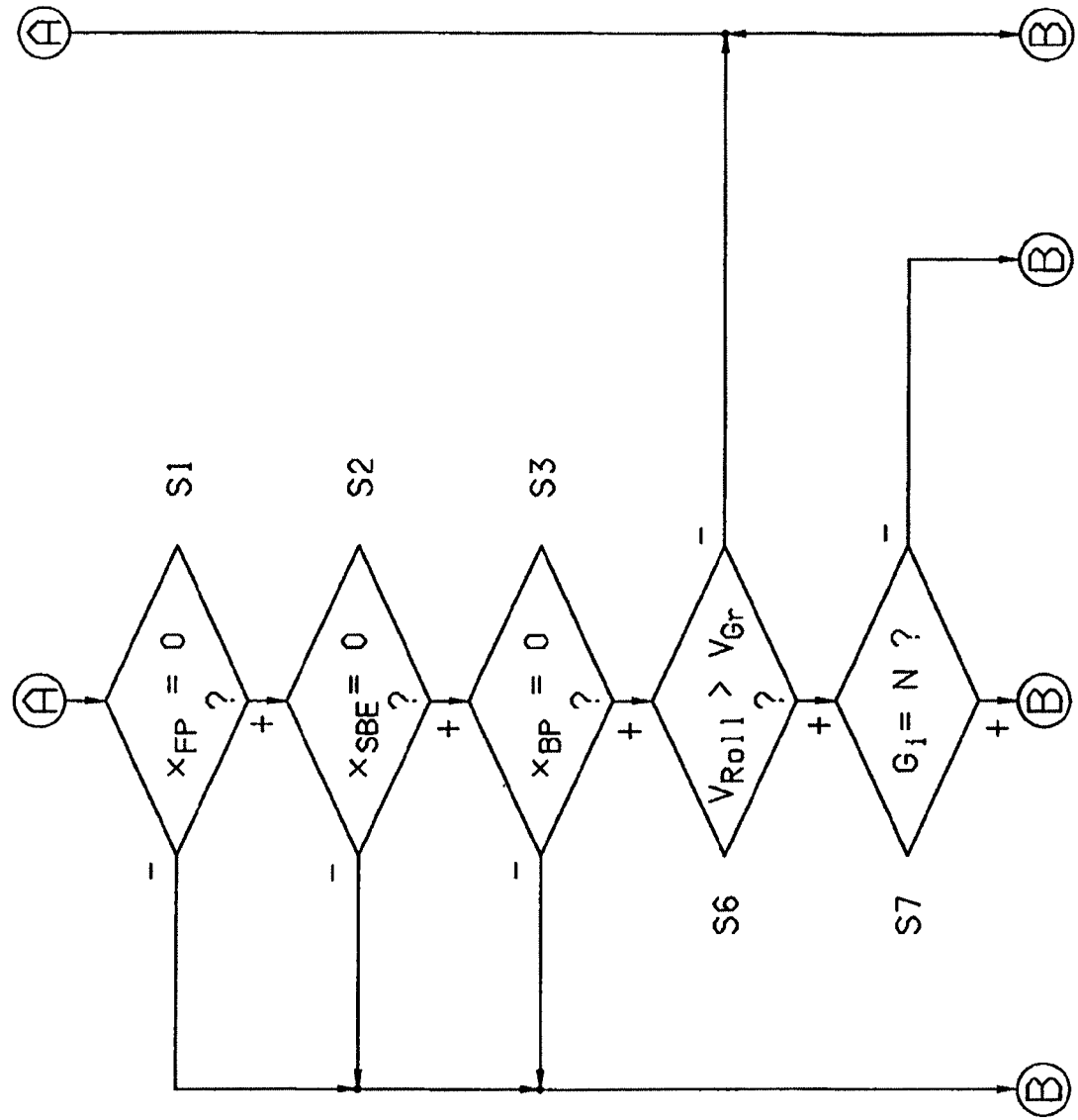
Figure 2C:
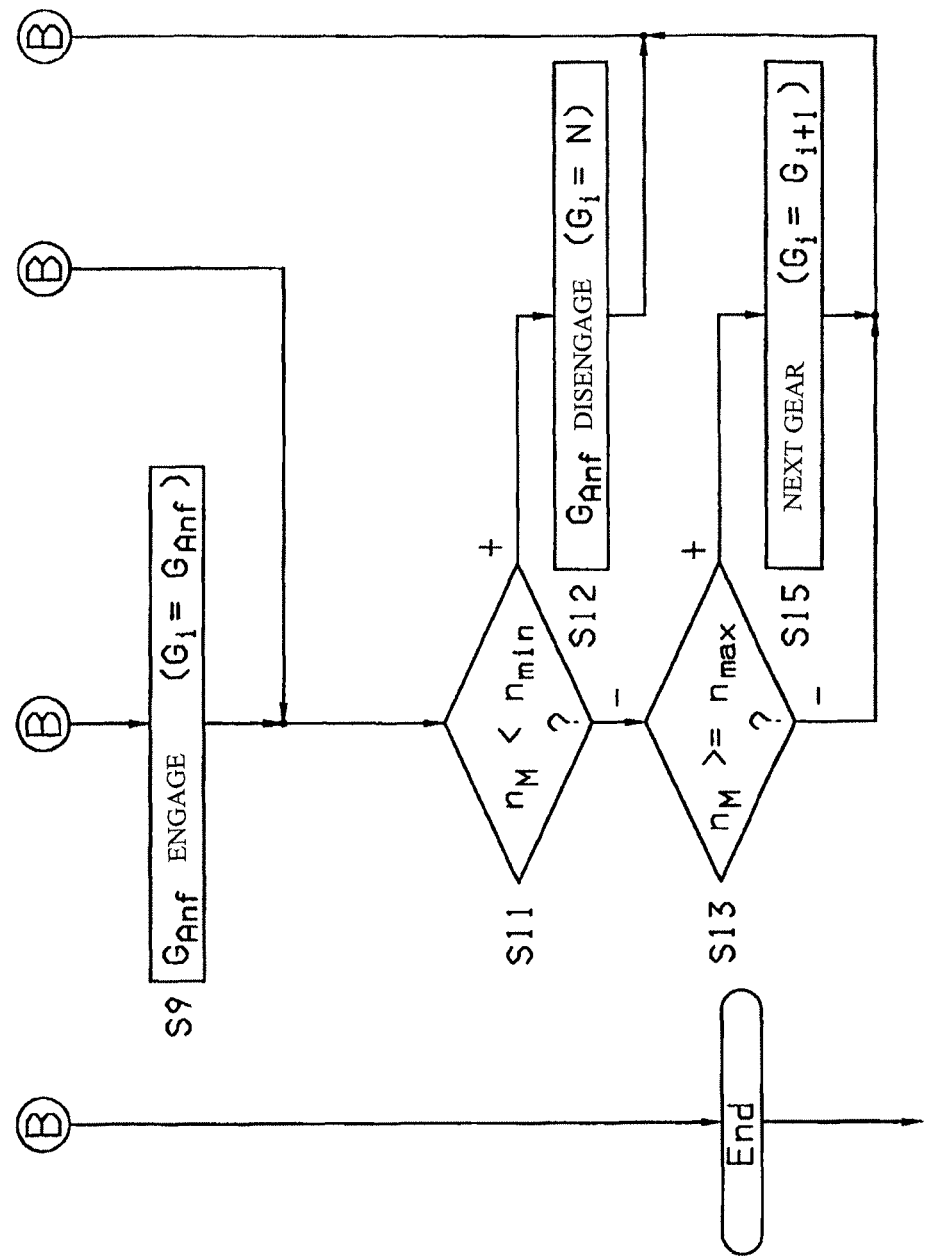

A variation of the method, in accordance with the three part flowchart of FIG. 2, which applies to a drive train of a geared transmission which is designed as a planetary automatic transmission, and a hybrid drive which is designed as an electric motor, is just different in its construction compared to the previously described variation of the method. Hereby, due to the electric motor, before leaving the safety function upstream steps S4, in FIG. 2B, and S5, in FIG. 2C, are omitted as well as the upstream step S8 and subsequent step S10, prior to the engagement of the starting gear, in FIG. 2C, in step S9. Instead of the disengagement of the friction clutch, step S12 engages the starting gear due to the construction and, when shifting up, step S14, upstream of step S15, and step S16, which follows step S15, are omitted.

Based on the invented safety function, a rolling motor vehicle is not kept in its position due to a present down slope of the road, however, the rolling is delayed as such that the driver, even when he temporarily left the driver seat, can react in time. The danger presented by the rolling is, therefore, significantly reduced in comparison to an uncontrolled rolling. Furthermore, the method does not require an additional apparatus and effort, but uses components, such as rotation speed sensors and shift and clutch discs, which are present anyway.

REFERENCE CHARACTERS $G_{anf}$ Starting Gear
$G_I$ Selected Gear
$G_{I+1}$ Next higher Gear
N Neutral, Neutral Position of the Transmission
$n_M$ Engine Rotation Speed
$n_{max}$ Maximum Rotation Speed
$n_{min}$ Minimum Rotation Speed
S1-S16 Method Steps
S1*-S3* Method Steps
$v_{Gr}$ Limited Speed
$v_{max}$ Maximum Speed
$v_{min}$ Minimum Speed
$v_{Roll}$ Rolling Speed
$x_{BP}$ Deflection of the Brake Pedal)
$x_{FP}$ Deflection of the Throttle
$x_K$ Disengagement rate of a friction clutch
$x_{SBE}$ Deflection of a shift control actuator element

The invention claimed is:

1. A method of controlling an automatic geared transmission of a motor vehicle by a safety function wherein the vehicle includes, on an input side of the transmission, a hybrid drive comprising a combustion engine and an electric motor and at least a controllable friction clutch and, on the output side of the transmission, wheels which are driven via an axle drive, the method of the safety function comprising the steps of:
   activating a safety function only after determining that:
      a vehicle rolling speed ($v_{Roll}$) is less than a predetermined minimum vehicle rolling speed ($v_{min}$), and
      a rotational speed ($n_M$) of at least one of the combustion engine and the electric motor is greater than a determined minimum rotation speed ($n_{min}$), and
      the transmission is in a neutral gear, and
      a brake is disengaged; and
   exiting the safety function when at least one of:
      a shift actuation element is actuated ($x_{SBE} \neq 0$);
      a throttle is actuated ($x_{FP} \neq 0$); and
      a brake pedal is actuated ($x_{BP} \neq 0$);
   while the safety function is activated, if the vehicle rolling speed ($v_{Roll}$) exceeds a predetermined speed limit ($v_{Gr}$), then engaging a starting gear by a sequence of steps selected from the group of sequences of steps consisting of:
      (A) engaging ($G_I$=$G_{Anf}$) the starting gear, and
      (B) disengaging ($x_K$=0) the friction clutch, engaging ($G_I$=$G_{anf}$) the starting gear, and reengaging ($x_K$=1) the friction clutch,
   thereby providing drag torque braking of the vehicle by the at least one of the combustion engine and the electric motor;
   wherein the safety function only provides for activation when the motor vehicle is unattended in one way or another and when the motor vehicle is not traveling in any direction.

2. The method according to claim 1, further comprising the step of, independent of a rolling direction, engaging a starting gear ($G_{Anf}$) for a forward drive which matches the predetermined speed limit ($v_{Roll} > v_{Gr}$).

3. The method according to claim 1, further comprising the step of also capturing an actual rolling direction through sensors and engaging a starting gear ($G_{Anf}$) which is effective in the direction of the rolling and which matches the predetermined speed limit ($v_{Roll} > v_{Gr}$).

4. The method according to claim 1, further comprising the step of, during a subsequent deceleration of the motor vehicle and upon detection of a condition from the group consisting of the vehicle rolling speed $v_{Roll}$ below the predetermined minimum speed ($v_{Min}$) and the rotational speed $n_M$ of at least one of the combustion engine and the electric motor falling below the predetermined minimum rotation speed $n_{Min}$, disengaging the friction clutch ($x_K$=0).

5. The method according to claim 4, further comprising the step of disengaging the engaged starting gear ($G_{Anf}$), after the disengagement of the friction clutch, at a latest of when the motor vehicle reaches standstill ($G_I$=N).

6. The method according to claim 1, further comprising the step of, during a subsequent deceleration of the motor vehicle and upon detection of a condition from the group consisting of the vehicle rolling speed ($v_{Roll}$) below the predetermined minimum speed ($v_{Min}$) and the rotational speed $n_M$ of at least one of the combustion engine and the electric motor falling below the predetermined minimum rotation speed $n_{Min}$, disengaging the engaged starting gear ($G_f$=N).

7. The method according to claim 1, further comprising the step of, during a subsequent, additional acceleration of the motor vehicle and upon detection of a condition from the group consisting of the vehicle rolling speed ($v_{Roll}$) at least reaching a predetermined vehicle maximum rolling speed ($v_{max}$) and the rotational speed ($n_M$) of at least one of the combustion engine and the electric motor at least reaching the predetermined maximum rotational speed $_{vmax}$, shifting to a next higher gear ($G_f$=$G_f$+1).

8. The method according to claim 1, further comprising the step of, during a subsequent, additional acceleration of the motor vehicle and upon detection of a condition from the group consisting of the vehicle rolling speed $v_{Roll}$ at least reaching a predetermined vehicle maximum rolling speed $v_{max}$ and the rotational speed $n_M$ of at least one of the combustion engine and the electric motor at least reaching the predetermined maximum rotational speed ($v_{max}$), automatically actuating braking of the motor vehicle.

9. The method according to claim 8, further comprising the step of controlling a braking torque of the motor vehicle brake so that a rolling speed of the motor vehicle is kept constant.

10. The method according to claim 8, further comprising the step of controlling a braking torque of a brake so that a rolling speed of the motor vehicle diminishes until standstill of the motor vehicle is reached.

11. The method according to claim 1, further comprising the step of, after actuation of at least one drive operating elements from the group of drive operating elements consisting of a shift actuation element, a throttle, and a brake pedal, terminating the safety function and a changing to a regular starting and drive mode, and the shift actuation element is one of a shift lever or gear selection lever.

12. The method according to claim 1, further comprising the step of, before termination of the safety function, initiating at least one of actuating the shift actuation element, actuating the brake pedal and disengaging the friction clutch.

13. A method of controlling an automatic geared transmission of a motor vehicle by a safety function wherein the vehicle includes, on an input side of the transmission, a hybrid drive comprising a combustion engine and an electric motor and, on the output side of the transmission, wheels which are driven via an axle drive, the method of the safety function comprising the steps of:
    activating a safety function only after determining that:
        a vehicle rolling speed ($v_{Roll}$) is less than a predetermined minimum vehicle rolling speed ($v_{min}$), and
        a rotational speed ($n_M$) of at least one of the combustion engine and the electric motor is greater than a determined minimum rotation speed ($n_{min}$), and
        the transmission is in a neutral gear, and
        a brake is disengaged;
    exiting the safety function when at least one of:
        a shift actuation element is actuated ($x_{SBE}$≠0) so as to shift the transmission out of the neutral gear;
        a throttle is actuated ($x_{FP}$≠0); and
        a brake pedal is actuated ($x_{BP}$≠0);
    while the safety function is activated, if the vehicle rolling speed ($v_{Roll}$) exceeds a predetermined speed limit ($v_{Gr}$), then engaging a starting gear ($x_K$=0);
    thereby providing drag torque braking of the vehicle by the at least one of the combustion engine and the electric motor;
    wherein the safety function only provides for activation when the motor vehicle is unattended in one way or another and when the motor vehicle is not traveling in any direction.

14. The method according to claim 13, further comprising the step of, independent of a rolling direction, engaging a starting gear ($G_{Anf}$) for a forward drive which matches the predetermined speed limit ($v_{Roll}$>$v_{Gr}$).

15. The method according to claim 13, further comprising the step of also capturing an actual rolling direction through sensors and engaging a starting gear ($G_{Anf}$) which is effective in the direction of the rolling and which matches the predetermined speed limit ($v_{Roll}$>$v_{Gr}$).

16. The method according to claim 13, further comprising the step of, during a subsequent deceleration of the motor vehicle and upon detection of a condition from the group consisting of the vehicle rolling speed $v_{Roll}$ below the predetermined minimum speed ($v_{Min}$) and the rotational speed ($n_M$) of at least one of the combustion engine and the electric motor falling below the predetermined minimum rotation speed $n_{Min}$, disengaging the friction clutch ($x_K$=0).

17. The method according to claim 16, further comprising the step of disengaging the engaged starting gear ($G_{Anf}$), after the disengagement of the friction clutch, at a latest of when the motor vehicle reaches standstill ($G_f$=N).

18. The method according to claim 13, further comprising the step of, during a subsequent deceleration of the motor vehicle and upon detection of a condition from the group consisting of the vehicle rolling speed $v_{Roll}$ below the predetermined minimum speed $v_{Min}$ and the rotational speed $n_M$ of at least one of the combustion engine and the electric motor falling below the predetermined minimum rotation speed ($n_{Min}$), disengaging the engaged starting gear ($G_f$=N).

19. The method according to claim 13, further comprising the step of, during a subsequent, additional acceleration of the motor vehicle and upon detection of a condition from the group consisting of the vehicle rolling speed ($v_{Roll}$) at least reaching a predetermined vehicle maximum rolling speed ($v_{max}$) and the rotational speed ($n_M$) of at least one of the combustion engine and the electric motor at least reaching the predetermined maximum rotational speed ($v_{max}$), shifting to a next higher gear ($G_f$=$G_f$+1).

20. The method according to claim 13, further comprising the step of, during a subsequent, additional acceleration of the motor vehicle and upon detection of a condition from the group consisting of the vehicle rolling speed ($v_{Roll}$) at least reaching a predetermined vehicle maximum rolling speed $v_{max}$ and the rotational speed ($n_M$) of at least one of the combustion engine and the electric motor at least reaching the predetermined maximum rotational speed ($v_{max}$), automatically actuating braking of the motor vehicle.

* * * * *